(12) United States Patent
Bertocci et al.

(10) Patent No.: US 8,161,916 B2
(45) Date of Patent: Apr. 24, 2012

(54) DECUBITUS ULCER PREVENTION GARMENT FOR DOGS

(75) Inventors: Gina E. Bertocci, Louisville, KY (US); Karen Bertocci, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 45 days.

(21) Appl. No.: 12/652,559

(22) Filed: Jan. 5, 2010

(65) Prior Publication Data

US 2011/0283957 A1    Nov. 24, 2011

Related U.S. Application Data

(60) Provisional application No. 61/142,927, filed on Jan. 7, 2009.

(51) Int. Cl.
*A01K 13/00* (2006.01)

(52) U.S. Cl. ........................................................ 119/850

(58) Field of Classification Search .................. 119/814, 119/850, 854, 856, 838, 868, 869, 712, 907; 2/DIG. 3, 455, 459–462, 16, 20–22, 24, 267–268; 128/847; 604/291, 385.09; 602/13; 405/38, 405/54–58
See application file for complete search history.

(56) References Cited

U.S. PATENT DOCUMENTS

| | | | |
|---|---|---|---|
| 3,791,383 A | | 2/1974 | Friedman |
| 4,103,645 A | * | 8/1978 | Tyler .............................. 119/868 |
| 4,114,620 A | * | 9/1978 | Moore et al. ................... 607/104 |
| 4,479,457 A | | 10/1984 | Rotolo |
| 4,510,888 A | | 4/1985 | DeAngelis et al. |
| 4,527,991 A | * | 7/1985 | Msarsa ........................... 604/399 |
| 4,860,397 A | | 8/1989 | Guskov |
| 5,034,998 A | * | 7/1991 | Kolsky ................................ 2/465 |
| 5,144,708 A | * | 9/1992 | Pekar ............................. 137/223 |
| 5,341,765 A | | 8/1994 | McComb |
| 5,462,519 A | * | 10/1995 | Carver .............................. 602/47 |
| 5,463,985 A | * | 11/1995 | Shover ........................... 119/850 |
| 6,129,695 A | * | 10/2000 | Peters et al. ..................... 602/62 |
| 6,223,696 B1 | | 5/2001 | Murakami |
| 6,240,882 B1 | | 6/2001 | Gross |
| 6,460,560 B1 | * | 10/2002 | Weinheimer et al. ......... 137/232 |
| 6,613,007 B1 | | 9/2003 | Reid, Jr. |
| 6,892,734 B1 | | 5/2005 | Schleicher et al. |
| 7,000,616 B2 | | 2/2006 | Diaz et al. |

(Continued)

OTHER PUBLICATIONS

Fluehmann et al., "Canine Neurological Diseases in a Referral Hospital Population Between 1989 and 2000 in Switzerland," J Sm Anim Prac, 47, 2006, pp. 582-587.

(Continued)

*Primary Examiner* — Rob Swiatek
*Assistant Examiner* — Ebony Evans
(74) *Attorney, Agent, or Firm* — Stites & Harbison, PLLC; David W. Nagle, Jr.; Terry L. Wright

(57) ABSTRACT

Decubitus ulcer prevention garments for a dog are provided that include a fluid-filled bladder. The garments can include an inner layer that contacts and interacts with the body of the dog; an intermediate layer that interfaces with the inner layer and includes the fluid-filled bladder; and an outer layer joined to the inner layer and interfacing with the intermediate layer. The garments have a shape that is adapted to fit over and envelop the pelvic region of the dog such that the garments alleviate or reduce pressure on the soft tissues overlying the bony prominences of the pelvic region of a dog when the dog is lying in a recumbent position on a surface.

16 Claims, 9 Drawing Sheets

U.S. PATENT DOCUMENTS

| | | |
|---|---|---|
| 7,043,329 B2 | 5/2006 | Dias et al. |
| 7,141,032 B2 | 11/2006 | Flam et al. |
| 7,364,572 B2 | 4/2008 | Sandin et al. |
| 7,713,252 B2 * | 5/2010 | Greene et al. ............ 604/292 |
| 2002/0032485 A1 | 3/2002 | Flam et al. |
| 2002/0161346 A1 * | 10/2002 | Lockwood et al. ........ 604/315 |
| 2004/0111048 A1 | 6/2004 | Jensen et al. |
| 2004/0147863 A1 | 7/2004 | Dias et al. |
| 2004/0186452 A1 | 9/2004 | Sandin et al. |
| 2005/0049741 A1 | 3/2005 | Dias et al. |
| 2006/0064800 A1 | 3/2006 | Freund |
| 2007/0083141 A1 | 4/2007 | Flam et al. |
| 2007/0149912 A1 | 6/2007 | Flam et al. |
| 2007/0161933 A1 | 7/2007 | Ravikumar |
| 2007/0186328 A1 * | 8/2007 | Bulian ............................. 2/69 |
| 2007/0277282 A1 | 12/2007 | Sheppell |

OTHER PUBLICATIONS

Moore et al., "Causes of Death or Reasons for Euthanasia in Military Working Dogs: 927 Cases (1993-1996)," JAVMA, 219, 2001, pp. 209-214.

Swaim et al., "Complications: Pressure Ulcer-Related Wounds: Prevention and Treatment," NAVC Clin Brief, Dec. 2003, pp. 6-10.

Brienza et al., White Paper on Pressure Management, 2006, accessed at http://www.rercwm.pitt.edu/RERCWM_PDF/Pressure.pdf.

Brienza et al., "Using Support Surfaces to Manage Tissue Integrity," Adv. Skin Wound Care, 18(3), 2005, pp. 151-157.

Swaim et al., "Prevention and Treatment of Decubital Ulcers in the Dog," Vet. Met. Small An. Clin., 70, 1975, pp. 1069-1074.

* cited by examiner

DECUBITUS ULCER PREVENTION GARMENT FOR DOGS

RELATED APPLICATIONS

This application claims priority from U.S. Provisional Application Ser. No. 61/142,927, filed Jan. 7, 2009, the entire disclosure of which is incorporated herein by this reference.

TECHNICAL FIELD

The presently-disclosed subject matter relates to decubitus ulcer prevention garments for dogs or other quadrupeds. In particular, the presently-disclosed subject matter relates to decubitus ulcer prevention garments for dogs or other quadrupeds that include a fluid-filled bladder which alleviates or reduces pressure on the soft tissues overlying the bony prominences of the pelvic region of a dog.

BACKGROUND

A common cause of chronic mobility impairment in dogs is hind limb paralysis. A dog's hind limbs may become paralyzed for various reasons, including, for example, a ruptured vertebral disc, degenerative myelopathy, a loss of limb due to cancer or other disease, or an injury that results in the inability to ambulate. Despite such impairment, many guardians remain committed to the continued care and well-being of their dogs and rely upon assistive technologies, such as canine wheelchairs, to provide mobility. However, even in the case where an assistive technology can provide an impaired dog with some level of mobility, the dog will still typically spend long periods of time in a recumbent position. Additionally, dogs may be constrained to a recumbent position for prolonged periods of time during recovery from surgery or illness.

When a dog is in a prolonged recumbent position due to either chronic, permanent mobility impairment, or temporary mobility impairment (such as that associated with surgical recovery), there is increased pressure applied to the soft tissues overlying the bony prominences of the pelvic region from the underlying surface upon which the dog is resting, which restricts blood flow and the supply of oxygen to the tissue, and can thus lead to possible tissue breakdown and the development of a decubitus (pressure) ulcer. Such ulcers often become hyperemic, edematous, and painful, and can lead to serious secondary complications, such as infection or tissue necrosis, requiring debridement and surgical repair. Ongoing intractable infections associated with decubitus ulcers are also often a factor affecting an owner's decision to euthanize their dog. Furthermore, such ulcers are very difficult to treat due to repeat pressure exposure, the inability to protect the affected body region, and the possible insult to the wound and/or its dressings by the dog. While current clinical recommendations are to place the dog on a pressure-relieving cushion or mattress, in many cases, the dog will pull or draw its body across the cushion surface, introducing shearing forces on the exposed tissue, and/or the dog may simply move or slide off of the cushioned area onto a hard surface.

Thus, there remains a need for a means for preventing decubitus ulcers that commonly afflict chronically and temporarily impaired dogs.

SUMMARY

The present invention is a decubitus ulcer prevention garment for a dog that alleviates or reduces pressure on the soft tissues overlying the bony prominences of the pelvic region of a dog.

In some embodiments, an exemplary decubitus ulcer prevention garment for a dog is comprised of three layers: an inner layer that contacts and interacts with the body of a dog; an intermediate layer that includes a fluid-filled bladder and interfaces with the inner layer; and an outer layer joined to the inner layer and also interfacing with the intermediate layer. In other embodiments, an exemplary decubitus ulcer prevention garment for a dog includes a fluid-filled bladder, such as one formed by joining two portions of thermoplastic sheeting. In either case, however, the garment has a shape that is adapted to fit over and envelop the pelvic region of the dog, and thus protect the soft tissues overlying the pelvic region from pressure that can lead to the development of a decubitus (pressure) ulcer. As a further refinement, in some embodiments, the garment extends down the legs of the dogs and envelops the stifle (knee) joints of the dog to provide further protection for the soft tissues in the upper portions of a dog's hind legs. As yet another refinement, in some embodiments, the garment extends further down the legs of the dogs and envelops both the stifle joints and the tarsus (ankle) joints of the dog.

The fluid-filled bladder of an exemplary decubitus ulcer prevention garment of the present invention is typically filled by using an inflation valve and subsequently provides a means by which pressure on the soft tissues overlying the bony prominences of the pelvic region of a dog is alleviated or reduced. As such, an exemplary decubitus ulcer prevention garment for a dog can include fluid-filled bladders of a variety of shapes and configurations to provide sufficient pressure reduction. For example, in some embodiments, the intermediate layer includes a fluid-filled bladder on a left side of the garment and a fluid-filled bladder on a right side of the garment such that the fluid-filled bladders are adapted to encompass the entirety of the dog's pelvic region. For another example, in certain embodiments, the fluid-filled-bladder is comprised of multiple, discrete cells that are interconnected by a series of passageways. For yet another example, in other embodiments, the fluid-filled bladder is comprised of multiple, discrete cells that are interconnected by a series of passageways and are arranged in a pattern of concentric rings that is adapted to be substantially centered on the bony prominences of the pelvic region of the dog.

As noted, an exemplary decubitus ulcer prevention garment in accordance with the present invention is adapted to fit over the pelvic region of a dog. Thus, in some embodiments, an exemplary decubitus ulcer prevention garment further includes one or more additional features such that a garment can be provided that easily fits the pelvic region of a particular dog. For instance, in some embodiments, an exemplary garment of the present invention further defines openings for the hind legs and genitalia of a dog. In some embodiments, the garment can further include one or more fasteners, such as snaps, strips of hook-and-loop fasteners, or other similar fasteners, along the free edges of an exemplary garment to allow the garment to be easily secured around the body and pelvic region of the dog.

DESCRIPTION OF EXEMPLARY EMBODIMENTS

The present invention is a decubitus ulcer prevention garment for a dog that alleviates or reduces pressure on the soft tissues overlying the bony prominences of the pelvic region of a dog.

Figure 1:
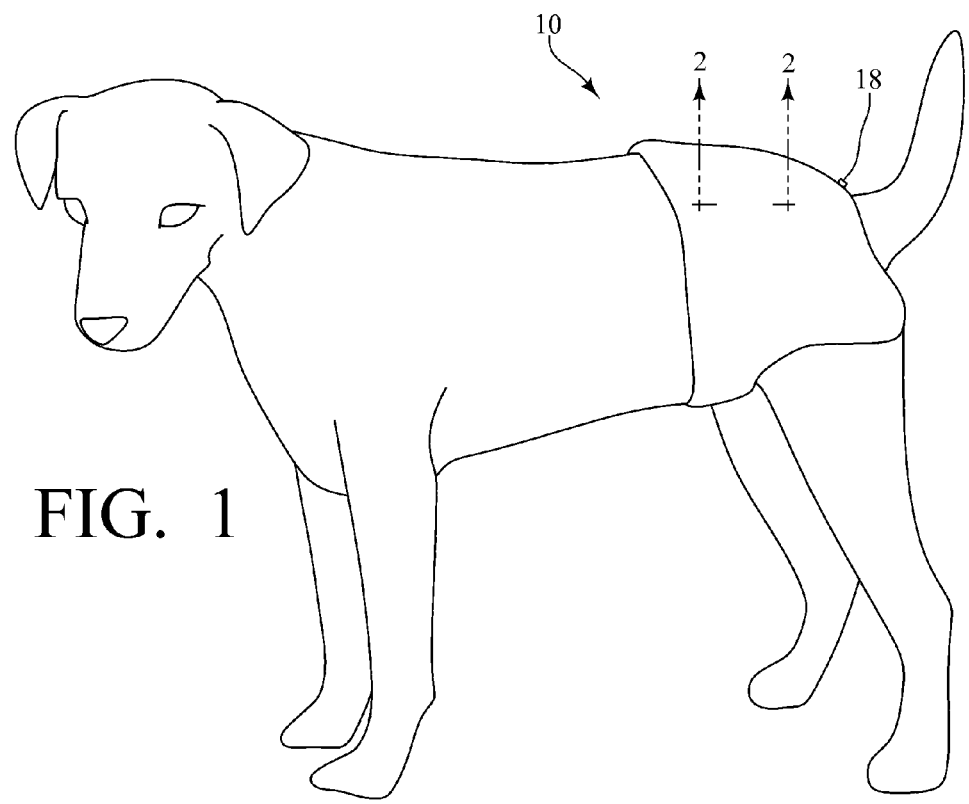
FIG. 1 is an illustration of an exemplary decubitus ulcer prevention garment made in accordance with the present invention as placed over the pelvic region of a dog.
Figure 2:
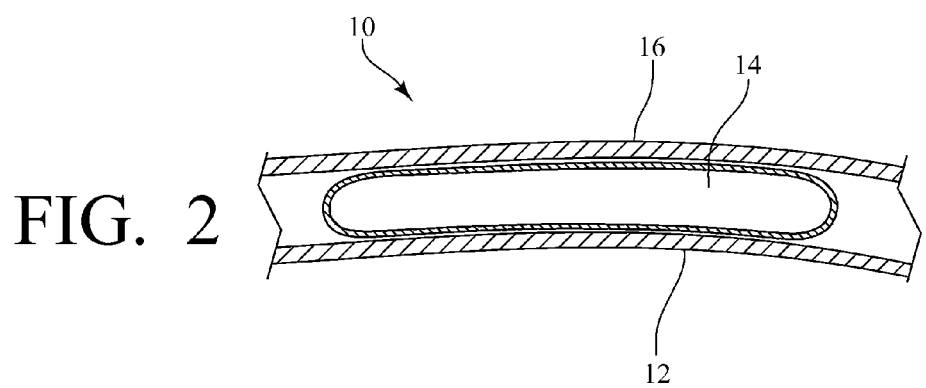
FIG. 2 is a cross-sectional view of the exemplary decubitus ulcer prevention garment depicted in FIG. 1 taken along line 2-2 of FIG. 1, and showing the inner layer, the intermediate layer in the form of a fluid-filled bladder, and the outer layer of the garment.

Referring first to FIGS. 1 and 2, in one exemplary embodiment of a decubitus ulcer prevention garment 10 for a dog made in accordance with the present invention, the garment 10 includes three layers: an inner layer 12 that contacts and interacts with the body of the dog; an intermediate layer 14 in the form of a fluid-filled bladder, which is filled with air or another fluid and interfaces with the inner layer 12; and an outer layer 16 that is joined to the inner layer 12 and also interfaces with the intermediate layer 14. Furthermore, as shown in FIG. 1, the garment 10 is provided with an inflation valve 18 that allows air or another fluid to be pumped into the bladder of the intermediate layer 14.

The inner layer 12 of the garment 10 is preferably made from a lightweight fabric that would be comfortable for the dog, since this is the portion of the garment 10 that contacts and interacts with the body of the dog. Although various fabrics may be suitable for use as the inner layer 12, a preferred fabric is antimicrobial (for odor and microbe control), hypoallergenic, capable of thermoregulation (i.e., moisture/heat control), breathable, and machine washable. For example, one preferred fabric is DRYLINE®, a fabric manufactured and distributed by Milliken & Company of Spartanburg, S.C. The DRYLINE® fabric is a dual-component fabric with a hydrophobic fiber (polyester) inside and a hydrophilic fiber (nylon) outside, and as a result, it dries more quickly than natural fiber fabrics as it draws liquids away from the wearer to the surface of the fabric where it evaporates. A stretch fiber is also incorporated into the DRYLINE® fabric to create a four-way stretch that allows it to conform to the contours of the body of the wearer.

As a further refinement to the inner layer 12, the use of a fabric treatment, such as AEGIS Microbe Shield®, can protect the fabric against odor-causing bacteria, mold, mildew and contaminating fungus. AEGIS Microbe Shield® is a registered trademark of AEGIS Environmental Management, Inc. of Midland, Mich. As another refinement to the inner layer 12, the use of another fabric treatment, such as AKWA-DYNE®, can further assist in thermoregulation by chemically modifying the nylon fibers to assist in moving moisture and excessive heat from the body to the surface of fabric. AKWADYNE® is a registered trademark of Comfort Technologies, Inc. of Charlotte, N.C.

Referring to FIG. 2, in some embodiments, the intermediate layer 14 is in the form of a continuous fluid-filled bladder, which is filled with air or another fluid and interfaces with the inner layer 12. The purpose of this intermediate layer 14 is to provide a means by which to alleviate or reduce pressure on the soft tissues overlying the bony prominences of the pelvic region that are covered by the garment 10. Specifically, the fluid in the bladder of the intermediate layer 14 reduces the pressures applied to the soft tissues, thus providing a cushioning effect and alleviating the pressure that can lead to the development of a decubitus ulcer. As such, the bladder is preferably made from a flexible, yet durable material. Although various materials may be suitable for the bladder, preferred materials include various thermoplastics, such as polyurethane, polyvinyl chloride, polyethylene, or polypropylene.

Finally, the outer layer 16 is joined to the inner layer 12 and interfaces with the intermediate layer 14. The purpose of the outer layer 16 is primarily to protect the intermediate layer 14. As such, the outer layer is typically made from a material that is durable and substantially abrasion resistant, but is still sufficiently lightweight and flexible such that the garment is comfortable for the dog. Although various fabrics may be suitable for use as the outer layer 16, preferred fabrics include CORDURA®, a fabric manufactured and distributed by E. I. du Pont de Nemours and Company of Wilmington, Del.; and SPANDURA®, a fabric manufactured and distributed by H. Warshow & Sons, Inc. of New York, N.Y.

The outer layer 16 of the garment 10 can be joined to the inner layer 12 by a variety of methods known to those of ordinary skill in the art. For example, in some embodiments, the outer layer 16 can be joined to the inner layer 12 by sewing, radio frequency welding, or using a suitable adhesive to join the inner and outer layers 12, 16 together (e.g., along the edges of the inner and outer layers 12, 16). In some embodiments, the outer layer 16 is joined to the inner layer 12 such that a pocket is created between the inner and outer layers 12, 16 for the insertion and removal of the intermediate layer 14. In this regard, by creating a pocket between the inner and outer layers 12, 16, not only can the intermediate layer 14 be easily inserted between the inner and outer layers 12, 16 to provide an exemplary garment 10, but the intermediate layer 14 can also be easily removed from the inner and outer layers 12, 16 to allow the inner and outer layers 12, 16 of the garment 10 to be washed as desired.

Upon assembly, however, the resultant three-layered garment 10 can then be placed on a dog. Specifically, the garment 10 has a shape adapted to fit over and engage the pelvic region, the greater trochanter, ischial tuberosities, and ischium the dog, as shown in FIG. 1. The garment 10 essentially envelops the pelvic region of the dog, protecting the soft tissue overlying the bony prominences, and the bony prominences themselves, from the pressure that can lead to the development of a decubitus (pressure) ulcer.

Figure 3A:
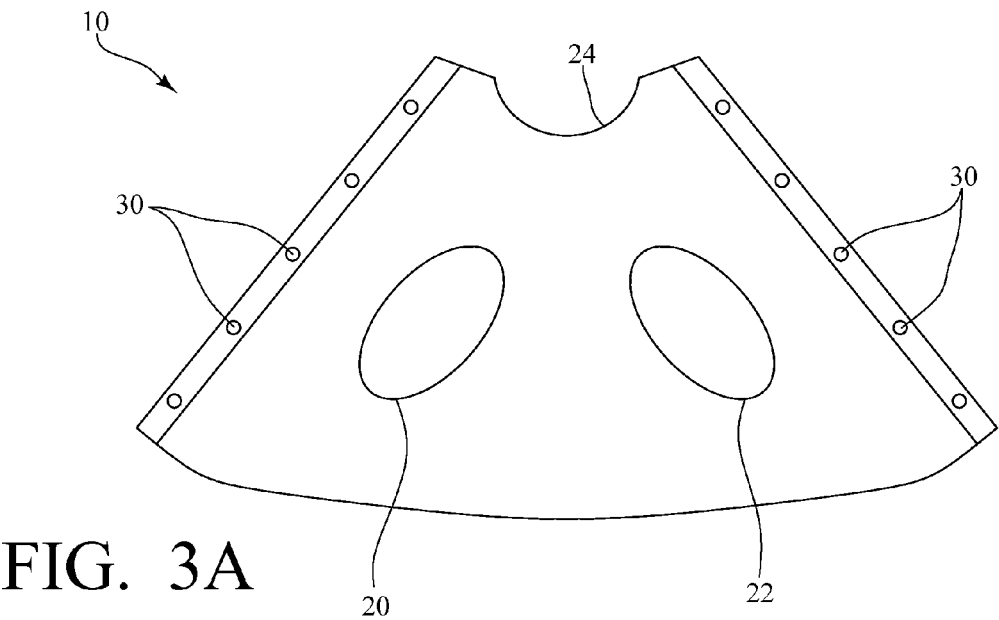
FIGS. 3A and 3B are plan views of exemplary decubitus ulcer prevent garments made in accordance with the present invention, and showing the openings in the garments for the hind legs and genitalia of a dog, as well as snaps extending along the edges of the garments.

FIG. 3A is a plan view of one appropriate shape for the garment 10 to achieve the desired enveloping of the pelvic region of the dog. As shown in FIG. 3A, although a one-piece construction, the garment 10 can be characterized as having two generally symmetrical sections that are permanently joined together, with openings 20, 22 through the garment 10 for the hind legs and an opening 24 for the genitalia of the dog. When the garment 10 is placed on the dog, snaps 30 along the free edges of the respective sections are used to secure the garment 10 around the body of the dog. Of course, other means for securing the garment to the dog can also be used without departing from the spirit and scope of the subject matter described herein, including, but not limited to, strips of hook-and-loop fasteners, buttons, zippers, or other similar fasteners.

Figure 3B:
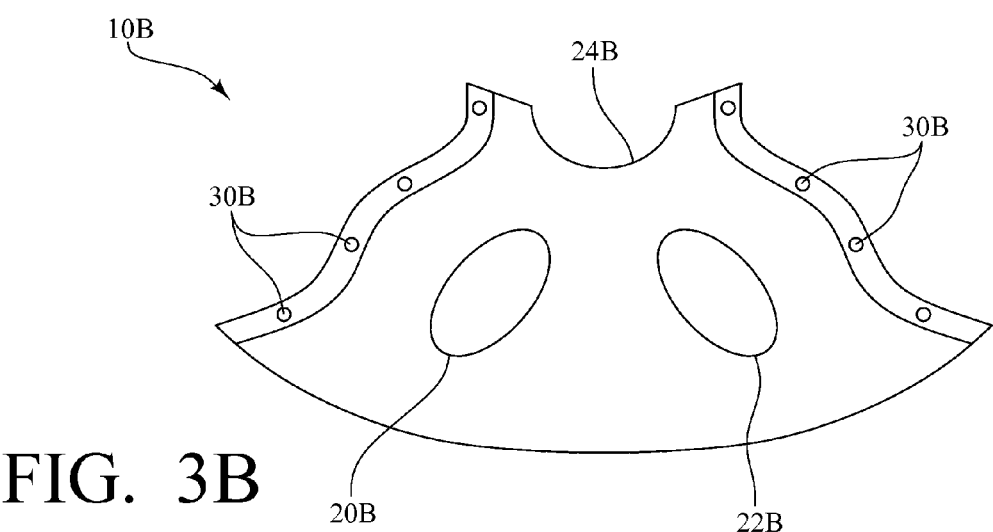

FIG. 3B is a plan view of another appropriate shape for the garment 10B to achieve the desired enveloping of the pelvic region of the dog. Again, the openings 20B, 22B through the garment 10B are for the hind legs, while the opening 24B is for the genitalia of the dog. Similar to the garment 10 shown in FIG. 3A, snaps 30B are also included along the edge of the garment 10B for securing the garment 10B to a dog.

Figure 4:
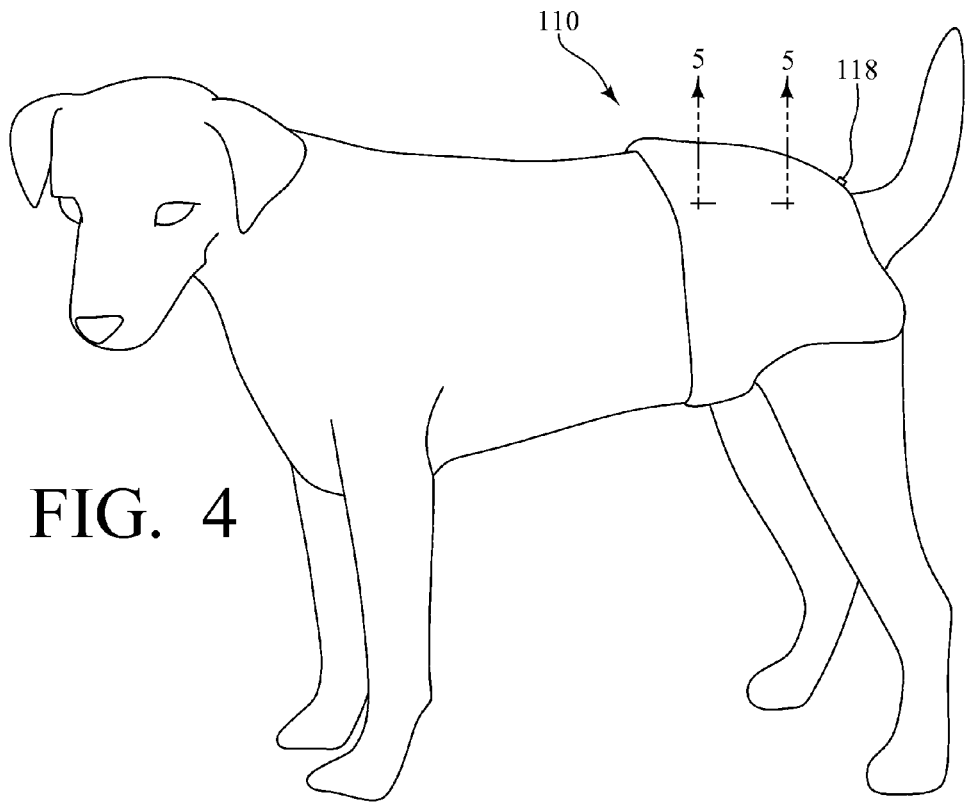
FIG. 4 is an illustration of another exemplary decubitus ulcer prevention garment made in accordance with the present invention as placed over the pelvic region of a dog.
Figure 5:
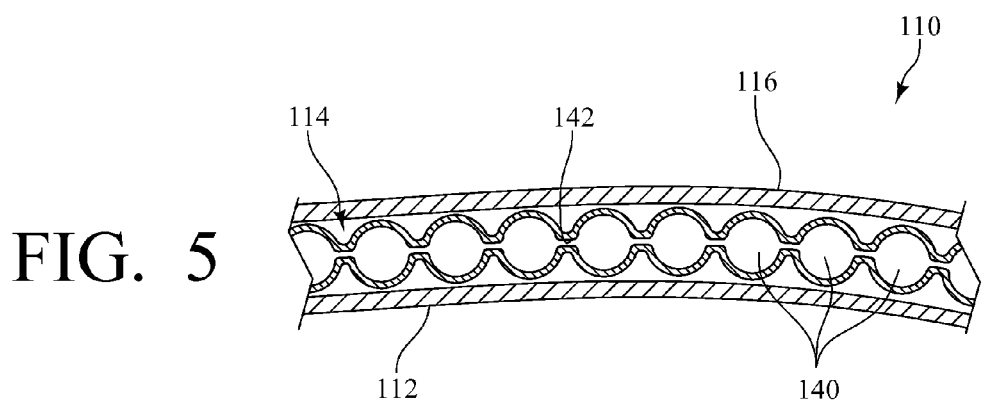
FIG. 5 is a cross-sectional view of the exemplary decubitus ulcer prevention garment depicted in FIG. 4 taken along line 5-5 of FIG. 4, and showing the inner layer, the intermediate layer in the form of multiple, discrete cells, and the outer layer.

FIGS. 4 and 5 illustrate another exemplary embodiment of a decubitus ulcer prevention garment 110 for a dog made in accordance with the present invention. This garment 110 also includes three layers: an inner layer 112 that contacts and interacts with the body of the dog; an intermediate layer 114 in the form of a fluid-filled bladder, which is filled with air or another fluid and interfaces with the inner layer 112; and an outer layer 116 joined to the inner layer 112 and also interfacing with the intermediate layer 114. Furthermore, as with the embodiment depicted in FIGS. 1 and 2, the garment 110 is provided with an inflation valve 118 that allows air or another fluid to be pumped into the bladder of the intermediate layer 114. However, in this exemplary embodiment, the bladder is comprised of multiple, discrete cells 140 which are interconnected by a series of passageways 142.

Figure 6:
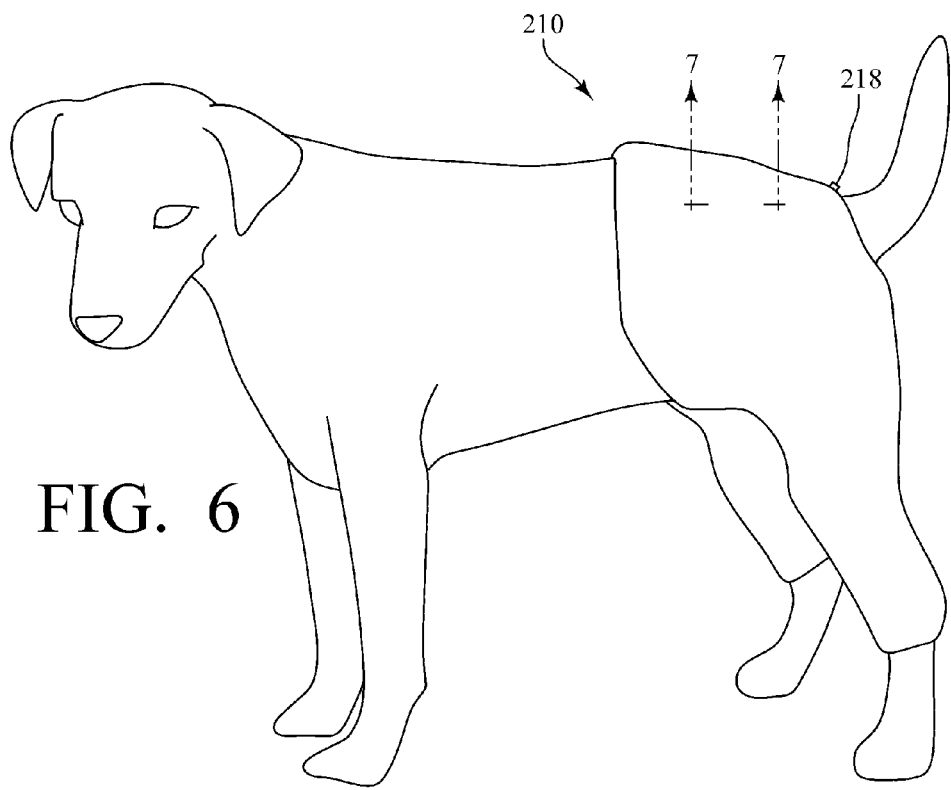
FIG. 6 is an illustration of another exemplary decubitus ulcer prevention garment made in accordance with the present invention as placed over the pelvic region of a dog, where the garment extends down the legs of the dog and envelops the stifle (knee) and tarsus (ankle) joints of the dog.
Figure 7:
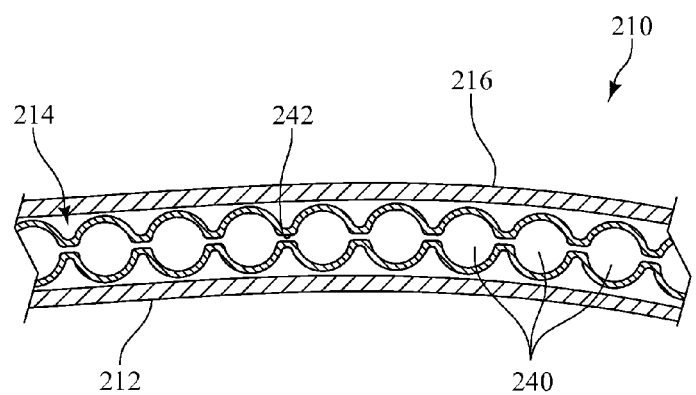
FIG. 7 is a cross-sectional view of the exemplary decubitus ulcer prevention garment depicted in FIG. 6 taken along line 7-7 of FIG. 6, and showing the inner layer, the intermediate layer in the form of multiple, discrete cells, and the outer layer.

FIGS. 6 and 7 illustrate another exemplary embodiment of a decubitus ulcer prevention garment 210 for a dog made in accordance with the present invention. This garment 210 is very similar to the embodiment depicted in FIGS. 4 and 5, including three layers: an inner layer 212 that contacts and interacts with the body of the dog; an intermediate layer 214 in the form of a fluid-filled bladder, which is filled with air or another fluid and interfaces with the inner layer 212; and an outer layer 216 joined to the inner layer 212 and interfacing with the intermediate layer 214. As shown in FIGS. 6 and 7, the garment 210 is also provided with an inflation valve 218 that allows air or another fluid to be pumped into the bladder of the intermediate layer 214, and the bladder is again comprised of multiple, discrete cells 240 which are interconnected by a series of passageways 242. However, in this exemplary embodiment, when placed on a dog, the garment 210 extends further down the hind legs of the dog (i.e., distal to the pelvic region) such that the garment 210 is capable of enveloping the stifle (knee) joints and is capable of enveloping the tarsus (ankle) joints of the dog to provide pressure reduction along the hind legs in addition to the pelvic region of the dog.

Figure 8:
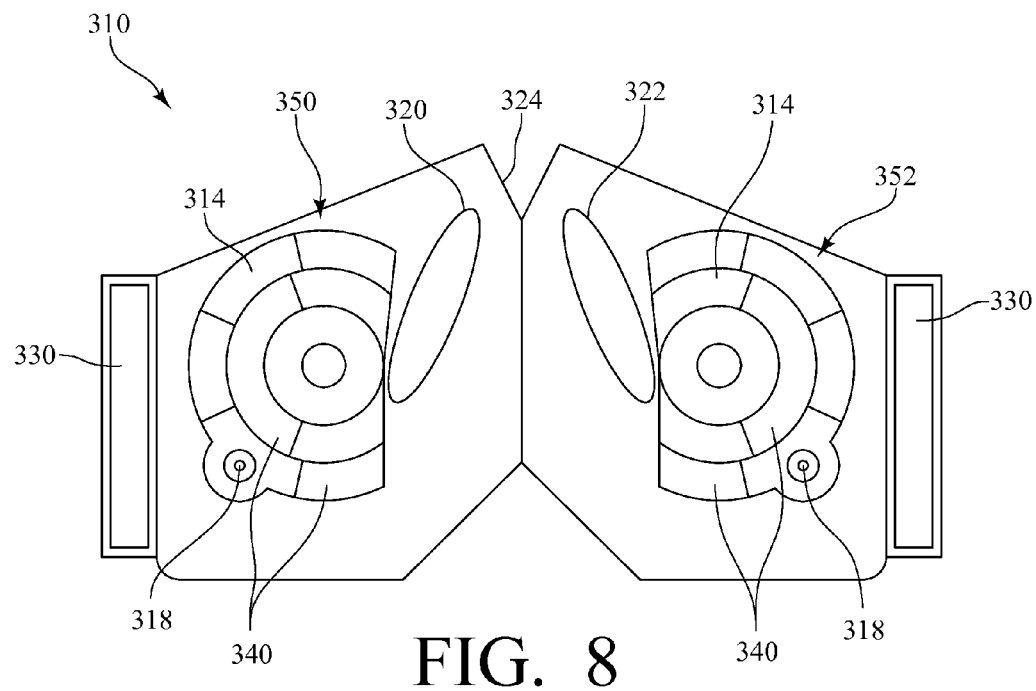
FIG. 8 is a plan view of another exemplary decubitus ulcer prevention garment made in accordance with the present invention, where the fluid-filled bladder includes multiple, discrete cells interconnected by a series of passageways and arranged in a pattern of concentric rings, and where the fasteners are strips of hook-and-loop fasteners that extend along the edges the garment.
Figure 9:
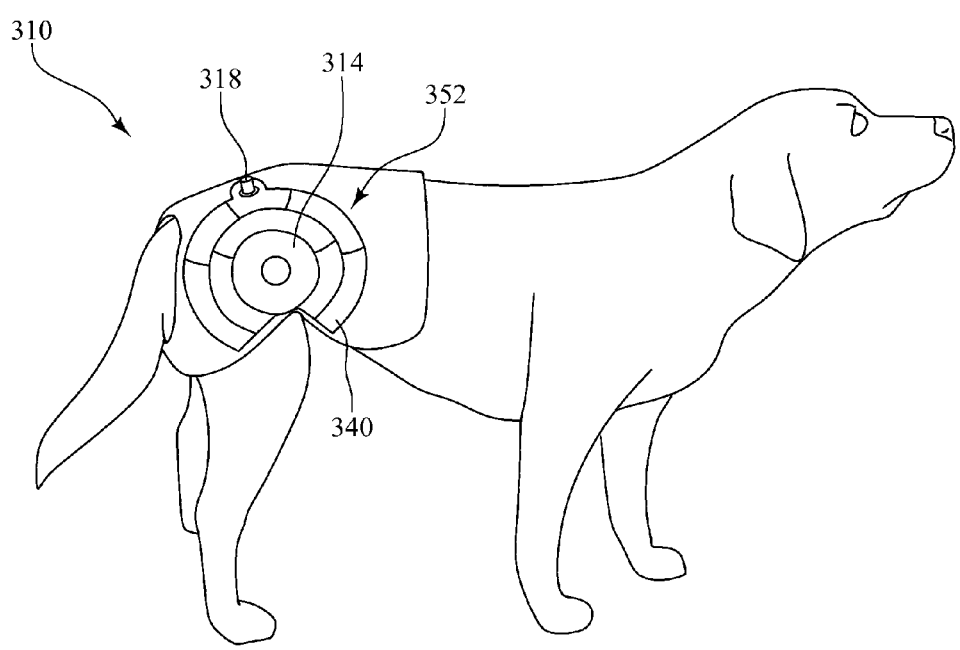
FIG. 9 is an illustration showing the exemplary decubitus ulcer prevention garment depicted in FIG. 8 placed over the pelvic region of a dog.

FIGS. 8 and 9 illustrate another exemplary embodiment of a decubitus ulcer prevention garment 310 for a dog made in accordance with the present invention. As shown in FIGS. 8 and 9, the garment 310 is in a shape that is adapted to fit over and envelop the pelvic region of the dog, and the garment 310 also includes openings 320, 322 for the hind legs of the dog and an opening 324 for the genitalia of a dog. The garment 310 further includes fasteners 330, in the form of strips of hook-and-loop fasteners, along the edges of the garment 310 for securing the garment to the dog. Furthermore, as with the embodiment depicted in FIGS. 1 and 2, the garment 310 has an inflation valve 318 that allows air or another fluid to be pumped into the bladder 314.

Unlike the garment 10 shown in FIGS. 1 and 2, however, the garment 310 does not include a separate inner layer and a separate outer layer that are joined together and interface with an intermediate layer including a fluid-filled bladder. Instead, the garment 310 is comprised of two sheets of material, with a fluid-filled bladder 314 formed between the two sheets of material by joining the two sheets together. As shown in FIGS. 8 and 9, in the exemplary embodiment, the fluid-filled bladder 314 is comprised of multiple, discrete cells 340 that are interconnected by a series of passageways (not shown). These cells 340 are arranged in a pattern 350 of concentric rings that is adapted to be substantially centered on the bony prominences of the pelvic region on the right side of the dog, and an identical pattern 352 of concentric rings that is adapted to be substantially centered on the bony prominences of the pelvic region on the left side of the dog. However, in this exemplary embodiment and as best shown in FIG. 8, the patterns 350, 352 are truncated along the edges nearest the openings 320, 322 for the hind legs of the dog.

As will be recognized by one of ordinary skill in the art, various methods can be used to form such a fluid-filled bladder 314 using two sheets of materials. For example, readily-available thermoplastic sheeting (e.g., polyethylene) can be used for the two sheets of material, and the cells 340 of the fluid-filled bladder 314 can be formed between the two sheets of material by using radio frequency welding or a manual heat welding technique to join the two sheets of material together to create the desired pattern of cells 340. In other words, the two sheets of material can be welded together in a predetermined pattern, with the void between welds forming each individual cell 340. Similarly, passageways between adjacent cells 340 can be formed by leaving an opening (i.e., an unwelded portion) along a border between the adjacent cells 340. In short, by using such a method, it is possible to produce a desired pattern of cells 340 in the garment 310 which extrude from the surface of the garment 310 and provide a cushioning effect, while also allowing the cells 340 to be interconnected with passageways to allow for air, or another fluid, to flow between the adjacent cells 340. For another example, it is contemplated that the desired pattern of cells 340 could be created through a thermoforming process. In either case, although such a garment 310 can be manufactured of flexible and/or durable materials such that the garment 310 does not require a separate inner layer (for comfort) and an outer layer, it is, of course, contemplated that such a garment 310 could be inserted in between an inner layer and an outer layer to provide additional levels of comfort and protection. Furthermore, it is additionally contemplated that one of the sheets of materials, which will ultimately contact and interact with the body of the dog, can also be impregnated with a softer material such that an exemplary garment can be provided that is more comfortable to the dog, but yet does not require a separate inner layer for comfort.

Figure 12:
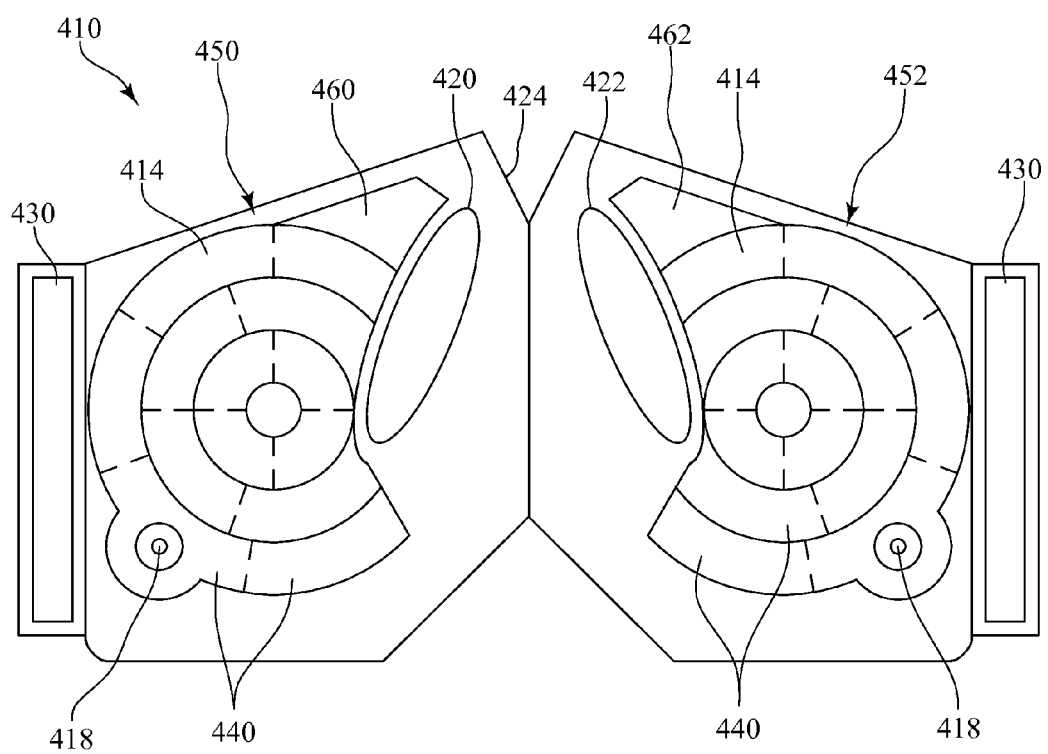
FIG. 12 is a plan view of an exemplary decubitus ulcer prevention garment similar to the one depicted in FIG. 8, but where the patterns of concentric rings are adapted to extend down the legs of the dog.

Referring now to FIG. 12, another exemplary embodiment of a decubitus ulcer prevention garment 410 made in accordance with the present invention is provided, which is similar to the embodiment depicted in FIGS. 8 and 9. As shown in FIG. 12, the garment 410 is again in a shape that is adapted to fit over and envelop the pelvic region of the dog and includes: openings 420, 422 for the hind legs of the dog; an opening 424 for the genitalia of a dog; fasteners 430 along the edges of the garment 410 for securing the garment to the dog; a fluid-filled bladder 414 that is comprised of multiple, discrete cells 440 that are interconnected by a series of passageways (not shown); and an inflation valve 418 that allows air or another fluid to be pumped into the bladder 414. The cells 440 are again generally arranged in a pattern 450 of concentric rings that is adapted to be substantially centered on the bony prominences of the pelvic region on the right side of the dog, and an identical pattern 452 of concentric rings that is adapted to be substantially centered on the bony prominences of the pelvic region on the left side of the dog. In this exemplary embodiment, the patterns 450, 452 are again truncated along the edges nearest the openings 420, 422 for the hind legs of the dog, but in closer proximity to those openings 420, 422 as compared to the exemplary embodiment depicted in FIG. 8. Furthermore, there is an additional cell 460, 462 associated with each pattern 450, 452 that is adapted to cover the ischial tuberosities when the garment 410 is placed on the dog.

Figure 15:
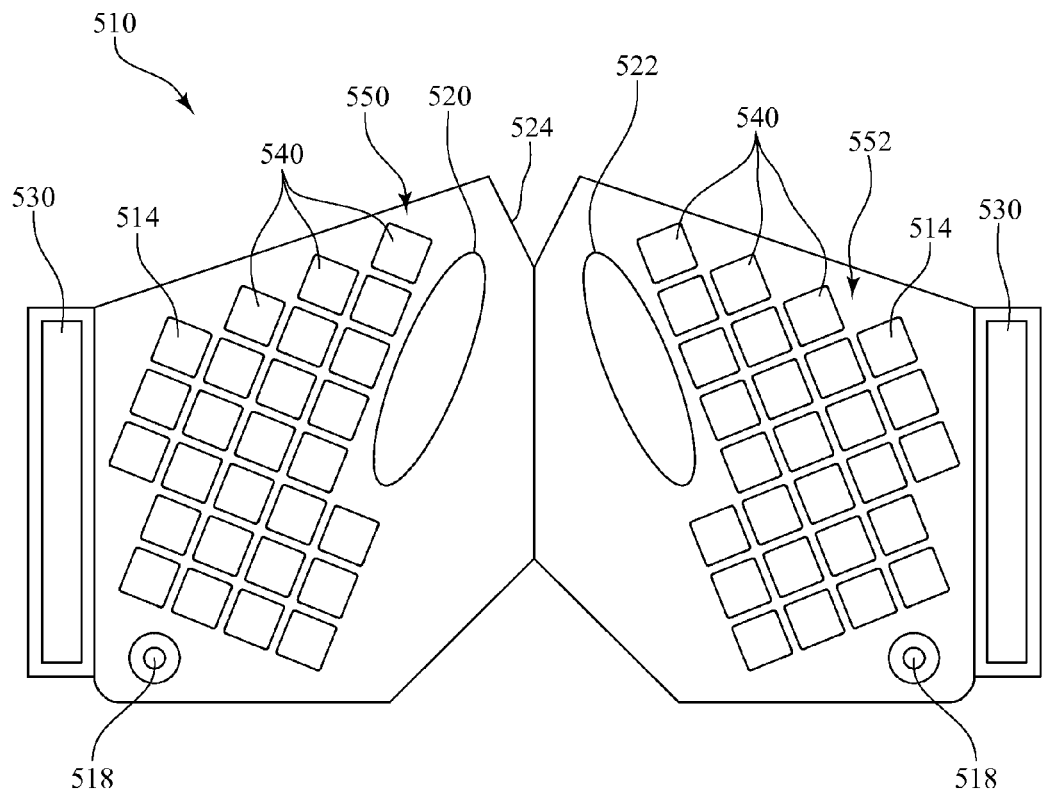
FIG. 15 is a plan view of another exemplary decubitus ulcer prevention garment, where the fluid-filled bladder includes multiple square-shaped cells that are interconnected by a series of passageways and extrude from the surface of the garment, and where the fasteners are strips of hook-and-loop fasteners that extend along the edges the garment.

FIG. 15 is plan view of yet another exemplary decubitus ulcer prevent garment 510 for dogs made in accordance with the present invention, which is similar to the embodiment depicted in FIGS. 8 and 9. As shown in FIG. 15, the garment 510 also includes: openings 520, 522 for the hind legs of the dog; an opening 524 for the genitalia of a dog; fasteners 530 along the edges of the garment 510 for securing the garment to the dog; a fluid-filled bladder 514 that is comprised of multiple, discrete cells 540 interconnected by a series of passageways (not shown); and an inflation valve 518 that allows air or another fluid to be pumped into the bladder 514. However, in this exemplary embodiment, the cells 540 are square-shaped and arranged in a pattern adapted to cover the bony prominence region of the pelvic region of the dog. Without wishing to be bound by any particular theory, it is believed that by including such a plurality of square-shaped cells 540 in the garment 510, the garment 510 is able to more completely envelop the pelvic region of a dog, and thus further reduce the shearing forces that the soft tissues overlying the bony prominences experience when a dog is in a recumbent position.

Figure 10:
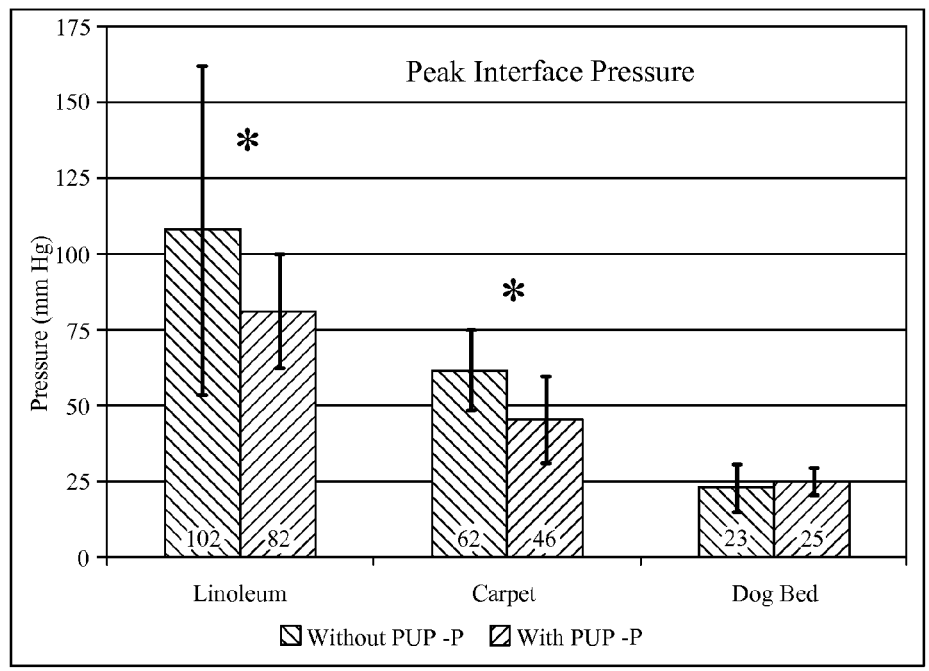
FIG. 10 is a graph showing the peak interface pressure observed in the pelvic region of a dog wearing the exemplary decubitus ulcer prevention garment depicted in FIG. 8 (with PUP-P) and in a dog not wearing the exemplary decubitus ulcer prevention garment depicted in FIG. 8 (without PUP-P), where the peak interface pressure was evaluated on various surfaces, and where the "*" indicates significant differences and the error bars indicate standard deviations.
Figure 11:
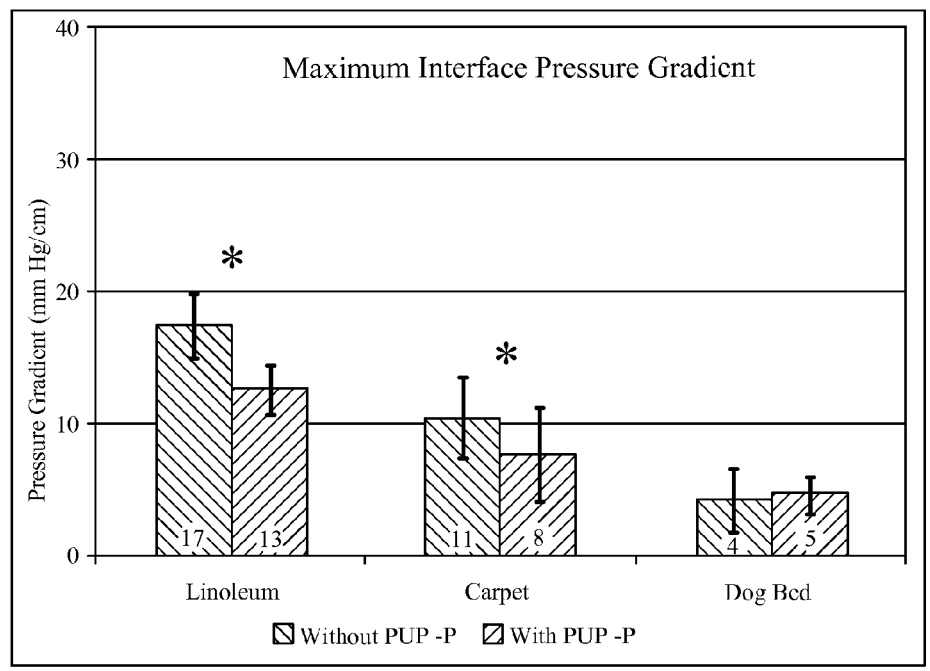
FIG. 11 is a graph showing the maximum interface pressure gradient observed in the pelvic region of a dog wearing the exemplary decubitus ulcer prevention garment depicted in FIG. 8 (with PUP-P) and in a dog not wearing the exemplary decubitus ulcer prevention garment depicted in FIG. 8 (without PUP-P), where the maximum interface pressure gradient was evaluated on various surfaces, and where the "*" indicates significant differences and the error bars indicate standard deviations.
Figure 13:
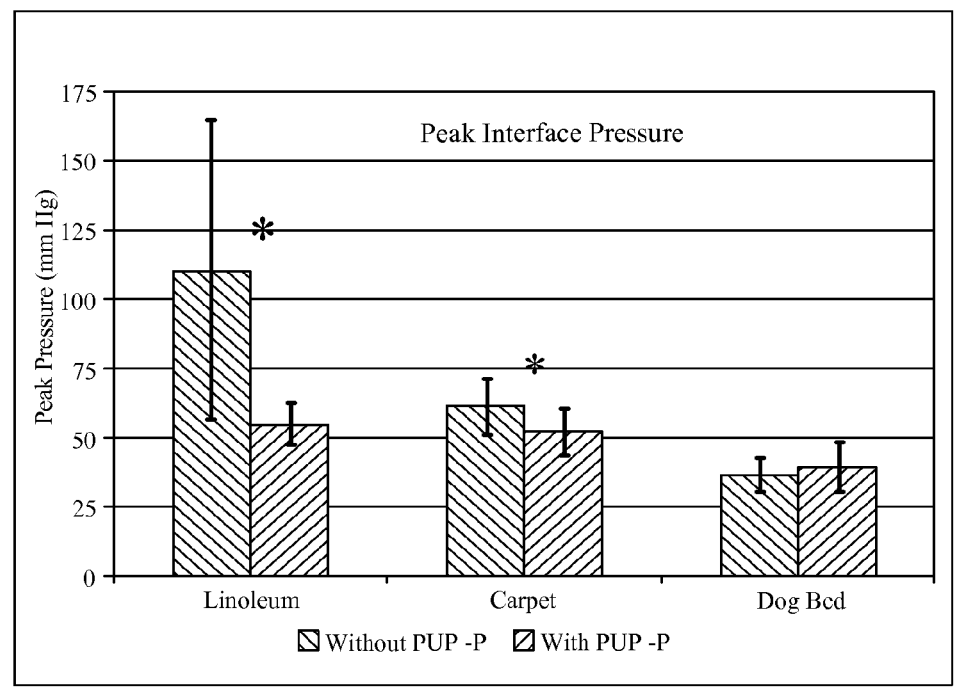
FIG. 13 is a graph showing the peak interface pressure observed in the pelvic region of a dog wearing the exemplary decubitus ulcer prevention garment depicted in FIG. 12 (with PUP-P) and in a dog not wearing the exemplary decubitus ulcer prevention garment depicted in FIG. 12 (without PUP-P), where the peak interface pressure was evaluated on various surfaces, and where the "*" indicates significant differences and the error bars indicate standard deviations.
Figure 14:
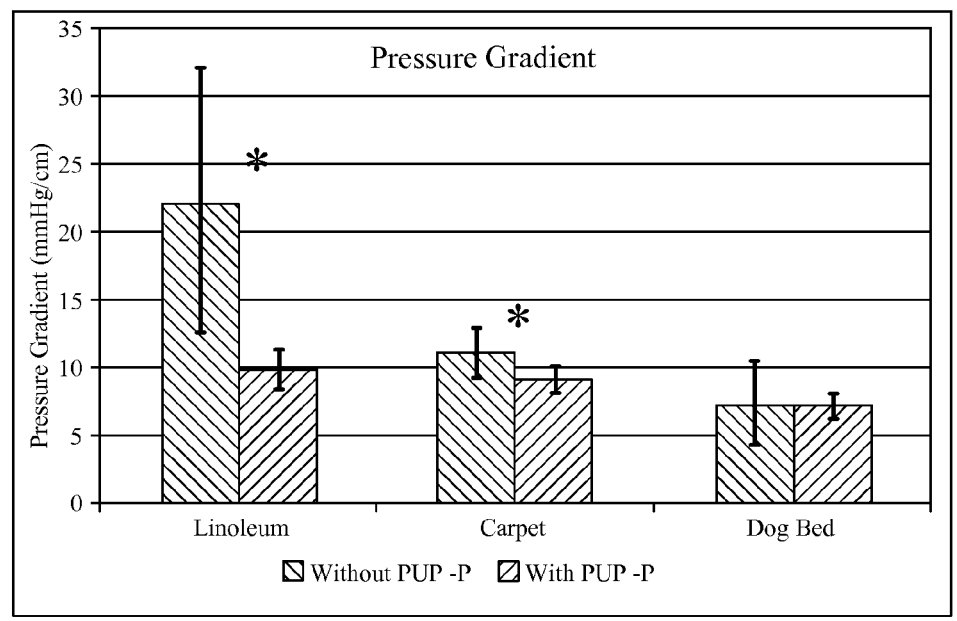
FIG. 14 is a graph showing the maximum interface pressure gradient observed in the pelvic region of a dog wearing the exemplary decubitus ulcer prevention garment depicted in FIG. 12 (with PUP-P) and in a dog not wearing the exemplary decubitus ulcer prevention garment depicted in FIG. 12 (without PUP-P), where the maximum interface pressure gradient was evaluated on various surfaces, and where the "*" indicates significant differences and the error bars indicate standard deviations.

Regardless of the particular configuration of the fluid-filled bladder in an exemplary decubitus ulcer prevent garment, it has been observed that the presently-disclosed garments are able to significantly reduce pelvic region interface pressure and pressure gradients experienced in the pelvic regions of dogs lying on a variety of surfaces. For example, as shown in FIGS. 10 and 11, by wearing the exemplary garment 310 depicted in FIGS. 8 and 9, both the pelvic region interface pressure and the pressure gradient were significantly reduced in the pelvic regions of dogs lying on linoleum and carpeted surfaces. Similarly, as shown in FIGS. 13 and 14, by wearing the exemplary garment 410 depicted in FIG. 12, the pelvic region interface pressure and the pressure gradient were also able to be significantly reduced in the pelvic regions of dogs lying on linoleum and carpeted surfaces. Furthermore, by using each of the exemplary garments 310, 410, it was observed that the garments could be effectively used to reduce pressure in the pelvic regions of the dogs, while not altering the postural stability of the dog or introducing discomfort to the dogs.

Thus, the above-described decubitus ulcer prevention garments for dogs can effectively be used as a means to prevent decubitus ulcers that commonly afflict chronically or temporarily impaired dogs. Furthermore, a variety of different fluid-filled bladders can be included in the garments to alleviate and reduce pressure on the soft tissues overlying the bony prominences of the dog's pelvic region, while still providing a garment that is capable of enveloping the pelvic region of a dog. Additionally, by including various openings and fasteners on the garment, the garment is able to be easily positioned onto a pelvic region of a dog, but remains comfortably in place during wear, which is of great importance in impaired dogs that may otherwise attempt to remove or tear at the garments.

Finally, although the presently-disclosed garments are described as being useful for the prevention of decubitus ulcers in dogs, it is contemplated that the garments can further be adapted for use in other quadrupeds, such as horses. In this regard, it is believed that the size and shape of the garments, as well as the position and configuration of the fluid-filled bladders in the garments, can be adapted to conform to the anatomical features of other quadrupeds such that the garments can envelope the pelvic region of those four-legged animals and reduce or alleviate pressure that may otherwise lead to the development of a decubitus ulcer.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A decubitus ulcer prevention garment for a dog, comprising:
   an inner layer that contacts and interacts with the body of the dog;
   an intermediate layer made of an impermeable thermoplastic that interfaces with the inner layer and includes a fluid-filled bladder comprised of a plurality of fluid-filled cells that are interconnected by a series of passageways, such that a fluid can flow between adjacent cells in order to provide a cushioning effect and alleviate pressure; and
   an outer layer joined to the inner layer and interfacing with the intermediate layer;
   wherein the garment has a shape adapted to fit over and envelop the pelvic region of the dog; and
   wherein the garment defines a pair of openings through the garment for the hind legs of the dog.

2. The garment of claim 1, wherein the intermediate layer includes a fluid-filled bladder on a left side of the garment and a fluid-filled bladder on a right side of the garment.

3. The garment of claim 1, wherein the garment further comprises an inflation valve for filling the bladder.

4. The garment of claim 1, wherein the garment extends down over the legs of the dog such that the garment envelops the knee joints of the dog.

5. The garment of claim 1, and further comprising one or more fasteners for securing the garment to the dog.

6. A decubitus ulcer prevention garment for a dog, comprising:
   an inner layer that contacts and interacts with the body of the dog;
   an intermediate layer made of an impermeable thermoplastic that interfaces with the inner layer and includes a fluid-filled bladder comprised of a plurality of fluid-filled cells that are interconnected by a series of passageways, such that a fluid can flow between adjacent cells in order to provide a cushioning effect and alleviate pressure; and
   an outer layer joined to the inner layer and interfacing with the intermediate layer;
   wherein the garment has a shape adapted to fit over and envelop the pelvic region of the dog; and
   wherein the garment defines an opening through the garment for the genitalia of the dog.

7. A decubitus ulcer prevention garment for a dog including a fluid-filled bladder made of an impermeable thermoplastic and comprised of a plurality of fluid-filled cells that are interconnected by a series of passageways, such that a fluid can flow between adjacent cells in order to provide a cushioning effect and alleviate pressure, the garment having a shape adapted to fit over and envelop the pelvic region of the dog, and defining openings for the hind legs and the genitalia of the dog.

8. The garment of claim 7, wherein the garment further comprises:
   an inner layer that contacts and interacts with the body of the dog, and interfaces with the fluid-filled bladder; and
   an outer layer joined to the inner layer and interfacing with the fluid-filled bladder.

9. The garment of claim 7, wherein the garment includes a fluid-filled bladder on a left side of the garment and a fluid-filled bladder on a right side of the garment.

10. The garment of claim 7, wherein the garment further comprises an inflation valve for filling the bladder.

11. The garment of claim 7, wherein the garment extends down over the legs of the dog such that the garment envelops the knee joints of the dog.

12. The garment of claim 7, and further comprising one or more fasteners for securing the garment to the dog.

13. A decubitus ulcer prevention garment for a dog including a fluid-filled bladder, the garment having a shape adapted to fit over and envelop the pelvic region of the dog, and defining openings for the hind legs and the genitalia of the dog, wherein the fluid-filled bladder is made of an impermeable thermoplastic and comprises a plurality of fluid-filled cells interconnected by a series of passageways, such that a fluid can flow between adjacent cells in order to provide a cushioning effect and alleviate pressure, with such fluid-filled cells being arranged in a pattern of concentric rings that is adapted to be substantially centered on the bony prominences of the pelvic region of the dog.

14. The garment of claim 13, wherein the pattern of concentric rings is further adapted to fit over the ischial tuberosity of the dog.

15. A decubitus ulcer prevention garment for a quadruped including a fluid-filled bladder made of an impermeable thermoplastic and comprised of a plurality of fluid-filled cells that are interconnected by a series of passageways, such that a fluid can flow between adjacent cells in order to provide a cushioning effect and alleviate pressure, the garment having a shape adapted to fit over and envelop the pelvic region of the quadruped, and defining openings for the hind legs and the genitalia of the quadruped.

16. A decubitus ulcer prevention garment for a quadruped including a fluid-filled bladder, the garment having a shape adapted to fit over and envelop the pelvic region of the quadruped, and defining openings for the hind legs and the genitalia of the quadruped, wherein the fluid-filled bladder is made of an impermeable thermoplastic and comprises a plurality of fluid-filled cells interconnected by a series of passageways, such that a fluid can flow between adjacent cells in order to provide a cushioning effect and alleviate pressure, with such fluid-filled cells being arranged in a pattern of concentric rings that is adapted to be substantially centered on the bony prominences of the pelvic region of the quadruped.

* * * * *